United States Patent
Hirashima et al.

(10) Patent No.: US 9,652,662 B2
(45) Date of Patent: May 16, 2017

(54) IMAGE PROCESSING DEVICE AND IMAGE PROCESSING METHOD

(71) Applicant: Panasonic Intellectual Property Management Co., Ltd., Osaka (JP)

(72) Inventors: Tsuyoshi Hirashima, Osaka (JP); Tatsumi Watanabe, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 108 days.

(21) Appl. No.: 14/642,444

(22) Filed: Mar. 9, 2015

(65) Prior Publication Data

US 2015/0178550 A1 Jun. 25, 2015

Related U.S. Application Data

(63) Continuation of application No. PCT/JP2012/008409, filed on Dec. 27, 2012.

(51) Int. Cl.
G06K 9/00 (2006.01)
G06T 11/60 (2006.01)
G06K 9/46 (2006.01)

(52) U.S. Cl.
CPC ..... *G06K 9/00228* (2013.01); *G06K 9/00268* (2013.01); *G06K 9/4661* (2013.01); *G06T 11/60* (2013.01)

(58) Field of Classification Search
CPC ........... G06K 9/00221; G06K 9/00228; G06K 9/00268; G06K 9/4661; G06T 11/60; H04N 1/62; H04N 1/628
See application file for complete search history.

(56) References Cited

U.S. PATENT DOCUMENTS

| 2004/0228528 | A1 | 11/2004 | Lao | |
|---|---|---|---|---|
| 2006/0239584 | A1* | 10/2006 | Motomura | G06T 15/50 382/274 |
| 2012/0120071 | A1* | 5/2012 | Thorn | G06T 17/00 345/420 |

FOREIGN PATENT DOCUMENTS

| JP | 2004-246456 A | | 9/2004 |
|---|---|---|---|
| JP | 2008-097657 A | | 4/2008 |
| JP | 2008097657 A | * | 4/2008 |
| JP | 2008-225971 A | | 9/2008 |

(Continued)

OTHER PUBLICATIONS

Enhancement of 3D Shape in 2D Natural Images using a Non-Photorealistic Shading Approach Tatsumi Watanabe; Shuichi Ojima 2008 Digest of Technical Papers—International Conference on Consumer Electronics Year: 2008 pp. 1-2, DOI: 10.1109/ICCE.2008.4587871.*

(Continued)

*Primary Examiner* — Kim Vu
*Assistant Examiner* — Michael Vanchy, Jr.
(74) *Attorney, Agent, or Firm* — McDermott Will & Emery LLP

(57) ABSTRACT

An image processing device includes: a face detector which detects a face region including a face of a person from an input image signal; a determination portion which determines, in the input image signal of the face region, an addition amount of a pixel value to be added to the input image signal of the face region based on a size of a difference in a pixel value between adjacent pixels; and a signal corrector which adds the addition amount to the pixel value of the input image signal of the face region.

6 Claims, 12 Drawing Sheets

(56) References Cited

FOREIGN PATENT DOCUMENTS

| JP | 2009-021964 A | 1/2009 |
|---|---|---|
| JP | 2009-211151 A | 9/2009 |

OTHER PUBLICATIONS

International Search Report issued in PCT/JP2012/008409, dated Feb. 26, 2013, with English translation.

* cited by examiner

| -1 | 0 | 1 |

| 1 |
|---|
| 0 |
| -1 |

| 1 | 1 | 1 |
|---|---|---|
| 1 | 1 | 1 |
| 1 | 1 | 1 |

IMAGE PROCESSING DEVICE AND IMAGE PROCESSING METHOD

RELATED APPLICATIONS

This application is a continuation of International Application No. PCT/JP2012/008409, filed on Dec. 27, 2012, the disclosure of which Application is incorporated by reference herein.

TECHNICAL FIELD

The present invention relates to an image processing device and an image processing method correcting a face of a person included in an image.

BACKGROUND ART

Conventionally, there have been disclosed technologies for detecting a face region including a face of a person from an image taken with the person as a subject, and correcting the image based on a feature amount of the face region. For example, Patent Document 1 describes a technology in which a face region is first detected, the race, the age, the gender, etc, of a subject are then estimated using the characteristic amounts of the detected face region, and correction parameters matching the estimated results are set to adjust the skin color of the face region and correct brightness against backlight.

In this case, the technology of Patent Document 1 divides races and ages into categories, sets a correction item for each combination of the categories, genders, and the presence or absence of backlight, generates a setting table, in which an increase-decrease amount or an increase-decrease rate of each gradation is set, as a correction parameter for each item, and stores the generated tables in a memory. Then, the estimated results of the races, the ages, the genders, etc, of subjects are matched with the setting tables to read the correction parameters corresponding to the estimated results.

However, the technology of Patent Document 1 does not specifically describe how to set an increase-decrease amount or an increase-decrease rate of each gradation. In addition, the adjustment of skin colors, the correction of brightness against backlight, blemish removal processing, and the smoothing correction of skins are only illustrated as correction contents.

Therefore, the technology of Patent Document 1 seems to be useful for a case in which the brightness of an entire face region is uniformly corrected as in brightness correction against backlight. However, the technology of Patent Document 1 does not specifically describe a method of setting an increase-decrease amount or an increase-decrease rate of each gradation. Therefore, it is difficult to obtain the effect of illuminating a shaded area according to the surface of the face of a person and the direction of a light source as in, for example, a case in which a shaded area of a face is illuminated using a reflection plate often used to actually take an image of a person.

CITATION LIST

Patent Document

Japanese Unexamined Patent Publication No. 2004-246456

SUMMARY OF INVENTION

The present invention is directed at solving the above conventional problem and has an object of providing an image processing device and an image processing method capable of illuminating a shaded area of a face of a person.

An image processing device according to an aspect of the present invention includes: a face detector which detects a face region including a face of a person from an input image signal; a determination portion which determines, in the input image signal of the face region, an addition amount of a pixel value to be added to the input image signal of the face region based on a size of a difference in a pixel value between adjacent pixels; and a signal corrector which adds the addition amount to the pixel value of the input image signal of the face region.

An image processing method according to an aspect of the present invention includes: a face detection step of detecting a face region including a face of a person from an input image signal; a determination step of determining, in the input image signal of the face region, an addition amount of a pixel value to be added to the input image signal of the face region based on a size of a difference in a pixel value between adjacent pixels; and a signal correction step of adding the addition amount to the pixel value of the input image signal of the face region.

According to the present invention, in the input image signal of the face region including the face of the person, the addition amount of the pixel value determined based on the size of the difference in the pixel value between the adjacent pixels is added to the pixel value of the input image signal of the face region. Accordingly, a shaded area of the face of the person can be illuminated.

DETAILED DESCRIPTION

Hereinafter, a description will be given of embodiments of the present invention with reference to the drawings. Note that the following embodiments are materialized examples of the present invention and do not limit the technical scope of the present invention.

(First Embodiment)

Figure 1:
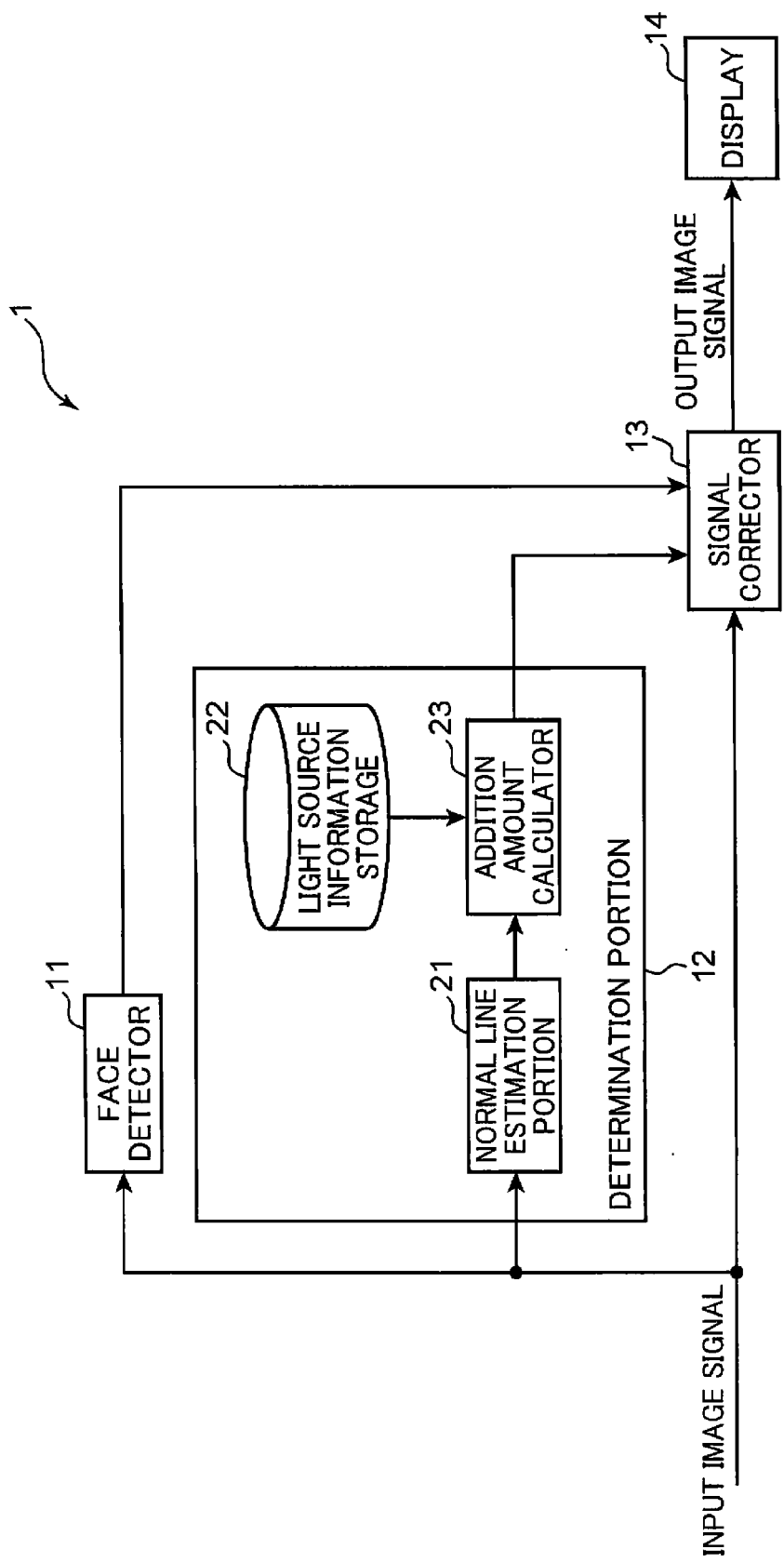
FIG. 1 is a block diagram showing the configuration of an image processing device of a first embodiment.
Figure 2:
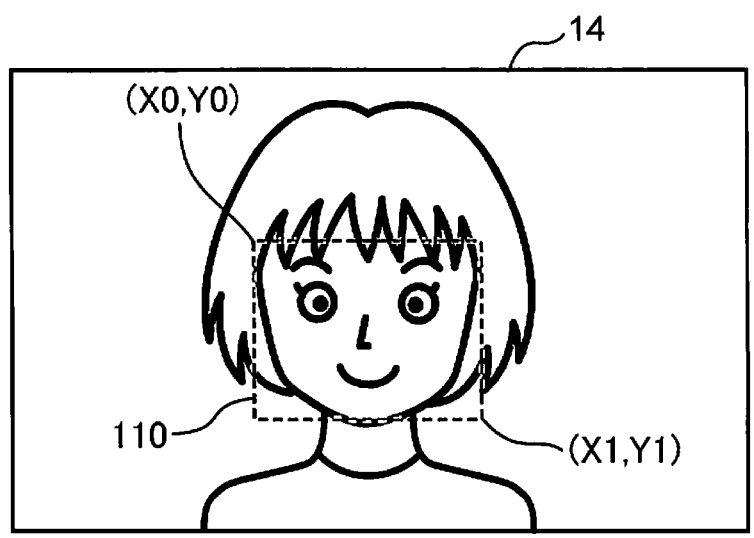
FIG. 2 is a diagram schematically showing a face region detected by a face detector.

FIG. 1 is a block diagram showing the configuration of an image processing device 1 of a first embodiment. FIG. 2 is a diagram schematically showing a face region detected by a face detector 11. As shown in FIG. 1, the image processing device 1 has the face detector 11, a determination portion 12, a signal corrector 13, and a display 14.

With a known method, the face detector 11 detects a face region including a face of a person based on an input image signal. Examples of a method of detecting a face region include a method of using a learning database having the feature points of a face and a method of narrowing down a face region through matching with a simple black-and-white pattern having the characteristics of the contrast of a face while reducing or enlarging an input image. In the first embodiment, the face detector 11 detects a rectangle face region 110 as shown in FIG. 2. The face detector 11 outputs a start point (X0, Y0) and an end point (X1, Y1) of the face region 110 to the signal corrector 13.

Note that although the embodiment is described based on means for detecting a face region, it may also be possible that only a face component such as an eye region is extracted and a rectangle region that represents a region to be corrected in an input image signal is determined based on the positional relationship of the face component. For example, it may also be possible that an eye region is extracted and a rectangle region is determined based on the distance between both eyes.

The determination portion 12 determines an addition amount of a pixel value to be added to the input image signal of the face region 110 based on a size of a difference in the pixel value between adjacent pixels. The determination portion 12 has a normal line estimation portion 21, a light source information storage 22, and an addition amount calculator 23.

Figure 3:
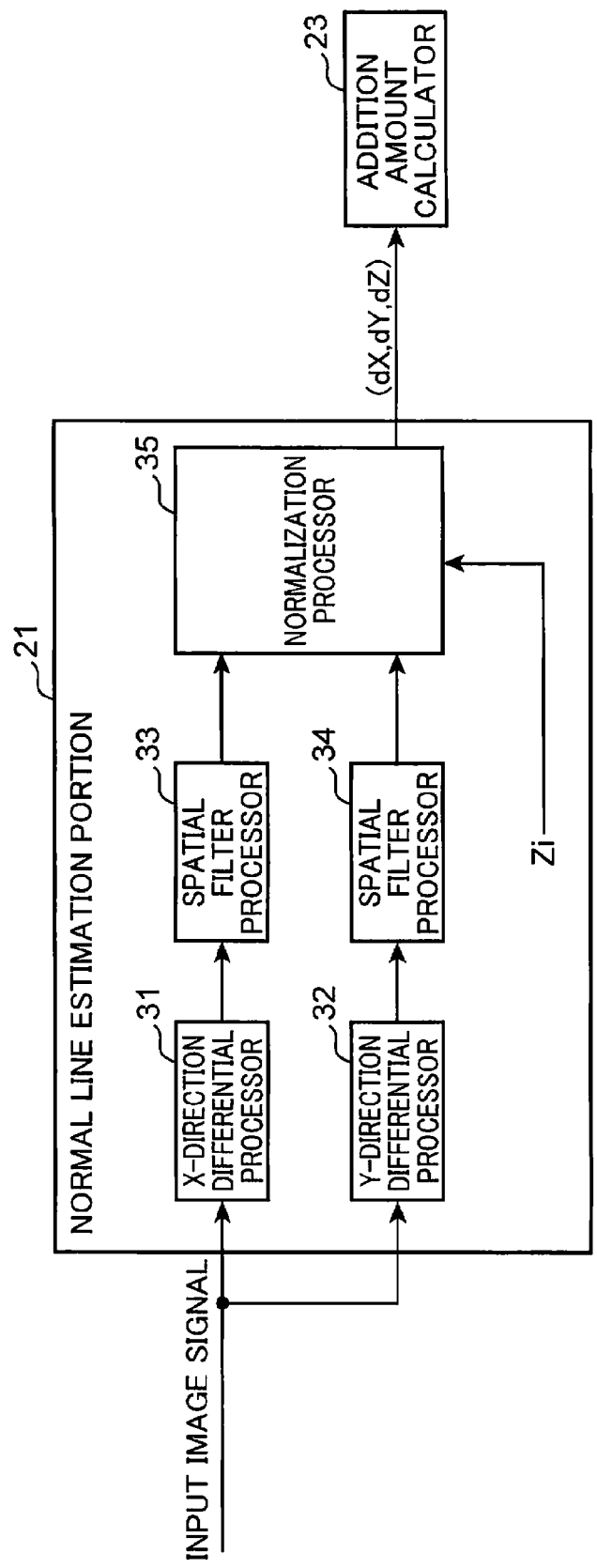
FIG. 3 is a block diagram showing the configuration of a normal line estimation portion shown in FIG. 1.
Figures 4, 5, 6, 7:
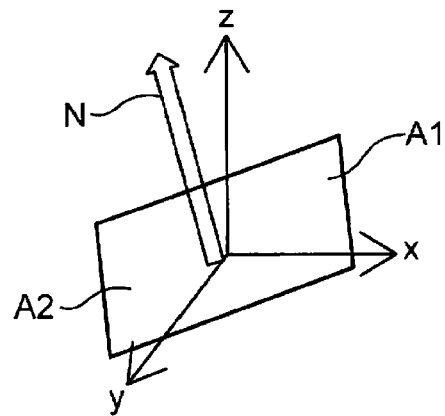
FIG. 4 is a diagram schematically showing a normal line vector estimated by the normal line estimation portion.
FIG. 5 is a diagram showing an example of a differential filter in an x direction.
FIG. 6 is a diagram showing an example of a differential filter in a y direction.
FIG. 7 is a diagram showing an example of a spatial filter.

FIG. 3 is a block diagram showing the configuration of the normal line estimation portion 21 shown in FIG. 1. FIG. 4 is a diagram schematically showing a normal line vector estimated by the normal line estimation portion 21. FIG. 5 is a diagram showing an example of a differential filter in an x direction. FIG. 6 is a diagram showing an example of a differential filter in a y direction. FIG. 7 is a diagram showing an example of a spatial filter.

The normal line estimation portion 21 has an x-direction differential processor 31, a y-direction differential processor 32, spatial filter processors 33 and 34, and a normalization processor 35. For each frame, the normal line estimation portion 21 estimates a normal line direction of a surface (hereinafter referred to as the "image surface") of a solid (specifically a face of a person) represented by an image for each pixel in an input image signal based on the size of a difference in the pixel value between adjacent pixels. Here, the normal line direction is represented by a three-dimensional normal line vector (X, Y, Z) obtained by adding height information (a Z component) to two coordinate values (an X component and a Y component) in a two-dimensional image. That is, the normal line estimation portion 21 generates the normal line vector that represents the normal line direction. In this specification, a pixel having a larger pixel value of the input image signal is defined to be convex compared to a pixel having a smaller pixel value of the input image signal. In other words, it is defined in this specification that a brighter image surface is closer to an observer than a darker image surface. This is based on the fact that a person "tends to feel a brighter item closer to the person" according to distance visual feature using person's monocular information.

In FIG. 4, it is assumed that the original point of an x-y-z coordinate system is, for example, an estimation target pixel used to estimate a normal line direction. In FIG. 4, when the pixel value of a region A1 in a +x direction and a −y direction is larger than the estimation target pixel and the pixel value of a region A2 in a −x direction and a +y direction is smaller than the estimation target pixel, a normal line vector N that represents the normal line direction is tilted in the −x direction on an x axis and in the +y direction on a y axis.

Accordingly, when a difference in the pixel value between an estimation target pixel and an adjacent pixel adjacent to the estimation target pixel becomes larger, the image surface of the estimation target pixel becomes more perpendicular to an x-y plane where the image exists. That is, when the difference in the pixel value between the estimation target pixel and the adjacent pixel adjacent to the estimation target pixel becomes larger, the normal line vector becomes more parallel to the x-y plane including the image. In other words, the X component or the Y component of the normal line vector (X, Y, Z) becomes larger. Thus, the concavo-convex degree of a face of a person as a three-dimensional substance can be estimated from an input image signal that represents two-dimensional plane data.

Specifically, in the embodiment, the x-direction differential processor 31 processes the pixel values of three pixels in total including an estimation target pixel and two pixels adjacent in the x direction using, for example, the differential filter shown in FIG. 5 to differentiate the estimation target pixel in the x direction. The x-direction differential processor 31 outputs a differential processing result (corresponding to an example of the first differential value) of the estimation target pixel in the x direction to the spatial filter processor 33.

The y-direction differential processor 32 processes the pixel values of three pixels in total including an estimation target pixel and two pixels adjacent in the y direction using, for example, the differential filter shown in FIG. 6 to differentiate the estimation target pixel in the y direction. The y-direction differential processor 32 outputs a differential processing result (corresponding to an example of the second differential value) of the estimation target pixel in the y direction to the spatial filter processor 34.

Using, for example, a smoothing filter shown in FIG. 7, each of the spatial filter processors 33 and 34 processes the pixel values of nine pixels in total including an estimation target pixel and eight pixels around the estimation target pixel with respect to the differential processing result of the x-direction differential processor 31 and the differential processing result of the y-direction differential processor 32 to perform spatial filter processing (corresponding to an example of the smoothing processing) on the estimation target pixel.

The spatial filter processor 33 outputs the spatial filter processing result (corresponding to the first smoothed value) to the normalization processor 35. The spatial filter processor 34 outputs the spatial filter processing result (corresponding to the second smoothed value) to the normalization processor 35. This spatial filter processing reduces small fluctuations in the differential processing results. Thus, the normal line direction of the image surface can be efficiently estimated.

The normal line estimation portion 21 sets the spatial filter processing result of the spatial filter processor 33 as the X component of the normal line vector (X, Y, Z). In addition, the normal line estimation portion 21 sets the spatial filter processing result of the spatial filter processor 34 as the Y component of the normal line vector (X, Y, Z). Moreover, the normal line estimation portion 21 retains a fixed value Zi determined in advance. The normal line estimation portion 21 sets the fixed value Zi as the Z component of the normal line vector (X, Y, Z). The fixed value Zi is used to obtain a three-dimensional normal line vector and may be set at an appropriate value such as 1 or 0.5. The normal line estimation portion 21 sets the retaining fixed value Zi as the Z component of the normal line vector to obtain a three-dimensional normal line vector from two-dimensional data in the x-direction and the y-direction.

The normalization processor 35 normalizes the normal line vector (X, Y, Z) such that a size of the normal line vector (X, Y, Z) becomes a constant value V (e.g., V=1) determined in advance. That is, the normalization processor 35 calculates the normal line vector (dX, dY, dZ) normalized so as to satisfy the relationship $(dX^2+dY^2+dZ^2)^{1/2}=V$. The normalization processor 35 outputs the calculated normal line vector (dX, dY, dZ) to the addition amount calculator 23.

In the embodiment, the x-direction differential processor 31 corresponds to an example of the first differential processor, the y-direction differential processor 32 corresponds to an example of the second differential processor, the x direction corresponds to an example of the first direction, the y direction corresponds to an example of the second direction, the z direction corresponds to an example of the third direction, the X component corresponds to an example of the component in the first direction, the Y component corresponds to an example of the component in the second direction, and the Z component corresponds to an example of the component in the third direction.

Referring back to FIG. 1, the light source information storage 22 stores in advance information on one or more light sources virtually provided to illuminate a shaded area of a face. The information on the light source includes the illumination direction of the light source and the light intensity thereof. The light source information storage 22 outputs the stored information on the light source to the addition amount calculator 23. In other words, the addition amount calculator 23 reads the information on the light source stored in the light source information storage 22.

The light source information storage 22 stores a three-dimensional light source vector that represents the illumination direction of the light source. As the illumination direction of the light source, the light source information storage 22 stores, for example, a direction in which a person is illuminated from below. With the addition of such a light source, the effect of illuminating a shaded area of a face with a reflection plate can be obtained. Note that illumination light from the light source is parallel light in the embodiment. Therefore, the effect of reflecting sunlight with a reflection plate can be obtained.

Figure 8:
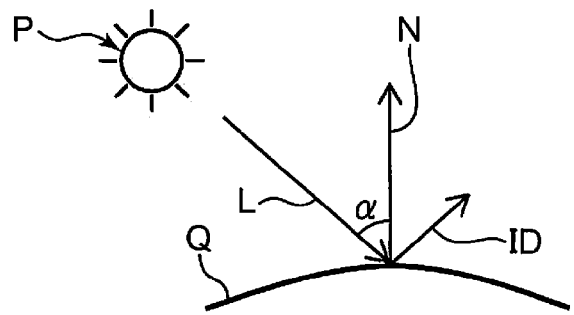
FIG. 8 is a diagram describing a Lambert's diffuse reflection model.
Figure 9:
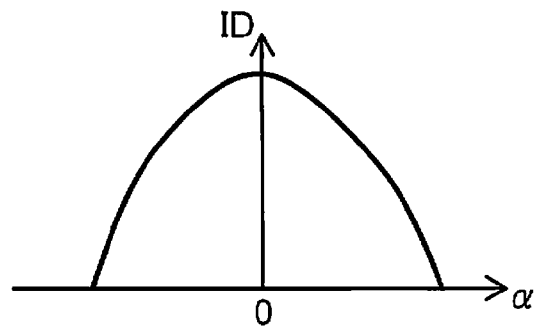
FIG. 9 is a diagram describing the Lambert's diffuse reflection model.
Figure 10:
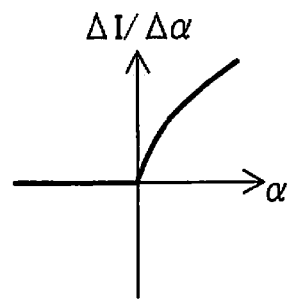
FIG. 10 is a diagram describing an addition amount calculated by an addition amount calculator.
Figure 11:
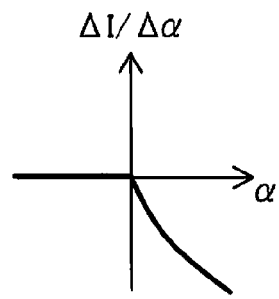
FIG. 11 is a diagram describing a comparative example for comparison with FIG. 10.
Figure 12:
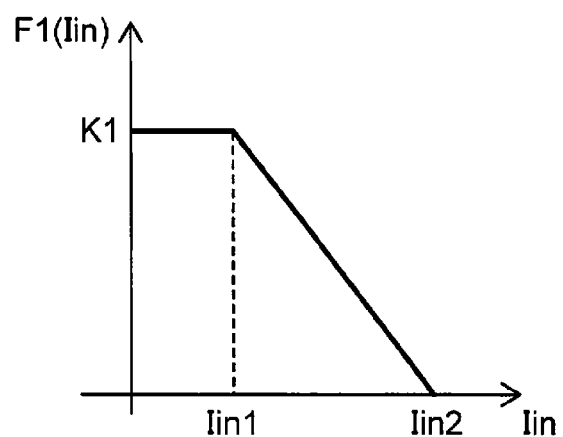
FIG. 12 is a diagram describing the calculation of an addition amount by the addition amount calculator.
Figure 13:
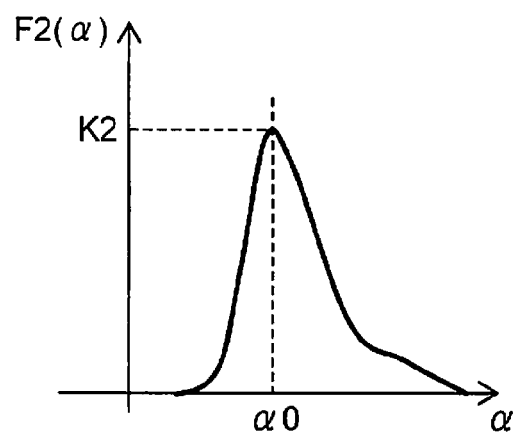
FIG. 13 is a diagram describing the calculation of the addition amount by the addition amount calculator.

FIG. 8 and FIG. 9 are diagrams describing a Lambert's diffuse reflection model. FIG. 10 is a diagram describing an addition amount calculated by the addition amount calculator 23. FIG. 11 is a diagram describing a comparative example for comparison with FIG. 10. FIG. 12 and FIG. 13 are diagrams describing the calculation of an addition amount by the addition amount calculator 23.

The addition amount calculator 23 calculates an addition amount of a pixel value (i.e., brightness) corresponding to an angle α, which is formed by the normal line vector estimated by the normal line estimation portion 21 and the light source vector stored in the light source information storage 22, for each pixel.

According to the Lambert's diffuse reflection model, the following expression (1) is established when an angle formed by a light source vector L from a light source P and a normal line vector N of a reflection surface Q is α as shown in FIG. 8.

$$ID=|L|\times|N|\times\cos \alpha \times C \times IL \tag{1}$$

Here, ID is reflection brightness, |L| is a size of the light source vector L, |N| is a size of the normal line vector N, C is a constant, and IL is incident brightness.

It is clear from the above expression (1) that the brightness ID of reflection light becomes larger as the angle α is smaller and that the brightness ID of the reflection light becomes smaller as the angle α is larger and closer to 90 degrees as shown in FIG. 9 according to the Lambert's diffuse reflection model.

In the embodiment, the incident brightness and the incident direction of the light source are unknown, for example, when an image represented by the input image signal is obtained by photographing or the like. Therefore, it is assumed in the embodiment that an image represented by the input image signal has been subjected to diffuse reflection by the Lambert's diffuse reflection model.

Then, the addition amount calculator 23 calculates an addition amount ΔI for each pixel based on the following expression (2) that uses, as a parameter, a change amount Δα of the angle a formed by the normal line vector estimated by the normal line estimation portion 21 and the light source vector stored in the light source information storage 22.

$$\Delta I=Iin \times \sin \alpha \times \Delta\alpha \tag{2}$$

Here, Iin is a pixel value of each pixel of the input image signal. It is clear from the above expression (2) that ΔI/Δα is proportional to sin α as shown in FIG. 10. Thus, a shaded area of a face can be illuminated.

Note that ΔI/Δα derived by differentiating both sides of the above expression (1) by α is proportional to (−sin α) as shown in FIG. 11. In this case, the stereoscopic effect of an image can be enhanced. That is, it can be said that the above expression (2) used in the embodiment is obtained by differentiating both sides of the above expression (1) by α and then inverting the symbols thereof to make ΔI/Δα proportional not to (−sin α) but to (+sin α), in order to acquire the effect of illuminating a shaded area of a face which is contrary to the effect of enhancing the stereoscopic effect.

In the embodiment, the addition amount calculator 23 calculates the change amount Δa based on the following expression (3) that uses functions F1(Iin) and F2(α) and a constant K0.

$$\Delta\alpha=F1(Iin) \times F2(\alpha) \times K0 \tag{3}$$

FIG. 12 shows an example of F1(Iin) that represents the function of the pixel value Iin of the input image signal. FIG. 13 shows an example of F2(α) that represents the function of the angle α. Note that data is expressed by eight bits in the embodiment. F1(Iin) is a value in the range of not less than 0 and less than 1. F2(α) is a value in the range of not less than 0 and not more than 1.

As shown in FIG. 12, the function F1(Iin) is a constant K1 ($0 \leq K1 < 1$, e.g., K1=0.5) when the pixel value Iin of the input image signal is in the range of 0 to a predetermined value Iin1. That is, since the gradation of an image deviates from the input image signal when the addition amount ΔI becomes large in a state in which the pixel value Iin is small, K1 is set as the upper limit of F1(Iin). The predetermined value Iin1 may be set at a value smaller than a maximum pixel value (255 in the embodiment) by a certain degree. When the predetermined value Iin1 is at, for example, about 20% of the maximum pixel value, Iin1 can be set at 50.

In addition, the function F1 (Iin) linearly decreases when the pixel value Iin exceeds the predetermined value Iin1 and is set at 0 when the pixel value Iin is a predetermined value Iin2. That is, the addition amount ΔI increases when the pixel value Iin is large, whereby the saturation of a pixel value is prevented. The predetermined value Iin2 may be set at a value close to the maximum pixel value (255 in the embodiment) by a certain degree. When the predetermined value Iin2 is at, for example. about 80% of the maximum pixel value, Iin2 can be set at 200.

As shown in FIG. 13, the function F2(α) is set at a maximum value K2 ($0 \leq K2 \leq 1$, e.g., K2=1) when the angle α is at a specific angle α0 determined in advance, and set to decrease when the angle α deviates from the specific angle α0. That is, the function F2 (α) is set such that the addition amount ΔI becomes large when the angle α is at the specific angle α0. The specific angle α0 is set in advance based on the concavo-convex characteristics of a face of a person, the illumination direction of the light source stored in the light source information storage 22, or the like. Note that the specific angle is not limited to a single angle. For example, the function F2(α) may also be set such that the addition amount separately increases based on specific angles.

In the above expression (3), K0 is a constant in the range of not less than 0 and not more than 255. In the embodiment, the constant K0 is set at a value corresponding to the light intensity of the light source stored in the light source information storage 22. That is, the addition amount calculator 23 sets K0 at, for example, 200 when the light intensity of the light source stored in the light source information storage 22 is large, and sets K0 at, for example, 50 when the light intensity of the light source stored in the light source information storage 22 is small.

Since the functions F1(Iin), F2(α) and the constant K0 are set as described above, the change amount Δα of an appropriate value can be obtained based on the above expression (3). As a result, the addition amount calculator 23 can calculate the addition amount ΔI of an appropriate value based on the above expression (2).

Figure 14:
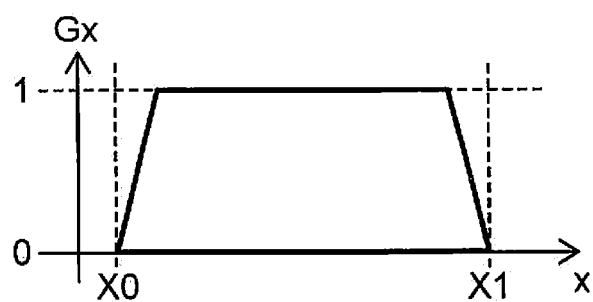
FIG. 14 is a diagram showing an example of a correction gain in the x direction.
Figure 15:
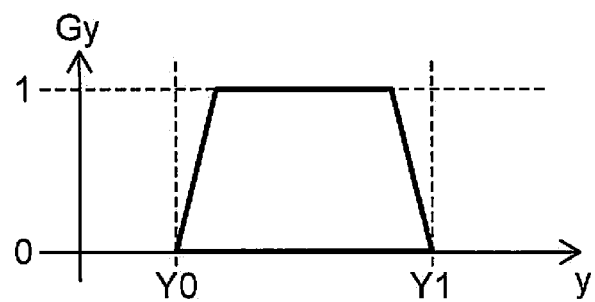
FIG. 15 is a diagram showing an example of a correction gain in the y direction.

FIG. 14 is a diagram showing an example of a correction gain Gx in the x direction. FIG. 15 is a diagram showing an example of a correction gain Gy in the y direction.

The signal corrector 13 retains the correction gains Gx and Gy. The signal corrector 13 multiplies the addition amount ΔI, which is calculated by the addition amount calculator 23, by the correction gain Gx in the x direction and the correction gain Gy in the y direction to obtain an addition amount ΔIg, that is, $\Delta Ig = Gx \times Gy \times \Delta I$.

As shown in FIG. 14 and FIG. 15, each of the correction gains Gx and Gy is set at 1 as the upper limit thereof at a central area distant from the boundary of the face region 110 (FIG. 2), set to linearly decrease toward the boundary of the face region 110, and set at 0 at the boundary of the face region 110. By the multiplication of the addition amount ΔI by the correction gains Gx and Gy, the addition amount ΔI gently decreases near the boundary of the face region 110. As a result, the occurrence of the difference between pixel values at the boundary of the face region 110 due to the addition amount ΔI can be prevented.

The signal corrector 13 adds the addition amount ΔIg, which has been multiplied by the correction gains Gx and Gy, to the pixel value Iin of each pixel of the face region 110 detected by the face detector 11 to calculate a corrected pixel value Ic, that is, $Ic = Iin + \Delta Ig$. The signal corrector 13 outputs the calculated corrected pixel value Ic to the display 14 as an output image signal. The display 14 has, for example, a liquid crystal display panel and displays an image based on the output image signal from the signal corrector 13. Note that a printer may further be provided, for example, and an image based on the output image signal from the signal corrector 13 may be printed.

As described above, according to the first embodiment, the normal line vector of an image surface is estimated by the normal line estimation portion 21, and an addition amount of a pixel value is calculated based on the angle α formed by the light source vector stored in the light source information storage 22 and the normal line vector. Accordingly, the effect of illuminating a shaded area of a face of a person included in an image with a reflection plate used to actually take an image of the person can be obtained.

Note that the addition amount calculator 23 calculates, when the light source information storage 22 stores the illumination directions of light sources, an addition amount for each of the light sources in the first embodiment. For example, when the light source information storage 22 stores the illumination direction of a main light source and the illumination direction of a sub-light source, the addition amount calculator 23 calculates an addition amount ΔI1 of the main light source based on an angle α1 formed by the normal line vector and the light source vector of the main light source and calculates an addition amount ΔI2 of the sub-light source based on an angle α2 formed by the normal line vector and the light source vector of the sub-light source.

The signal corrector 13 retains correction gains Gx1 and Gy1 for the main light source and correction gains Gx2 and Gy2 for the sub-light source. Here, the upper limits UL(Gx1), UL(Gy1), UL(Gx2), and UL(Gy2) of the respective correction gains Gx1, Gy1, Gx2, and Gy2 are set so as to satisfy the relationships UL(Gx1)+UL(Gx2)=1 and UL(Gy1)+UL(Gy2)=1. However, UL(Gx1) is set to be larger than UL(Gx2), and UL(Gy1) is set to be larger than UL(Gy2). That is, the upper limits of the correction gains for the main light source are set to be larger than the upper limits of the correction gains for the sub-light source.

The signal corrector 13 multiplies the addition amount ΔI1 by the correction gains Gx1 and Gy1 and multiplies the addition amount ΔI2 by the correction gains Gx2 and Gy2. Thus, all the information on the light sources stored in the light source information storage 22 is used in the first embodiment.

(Second Embodiment)

Figure 16:
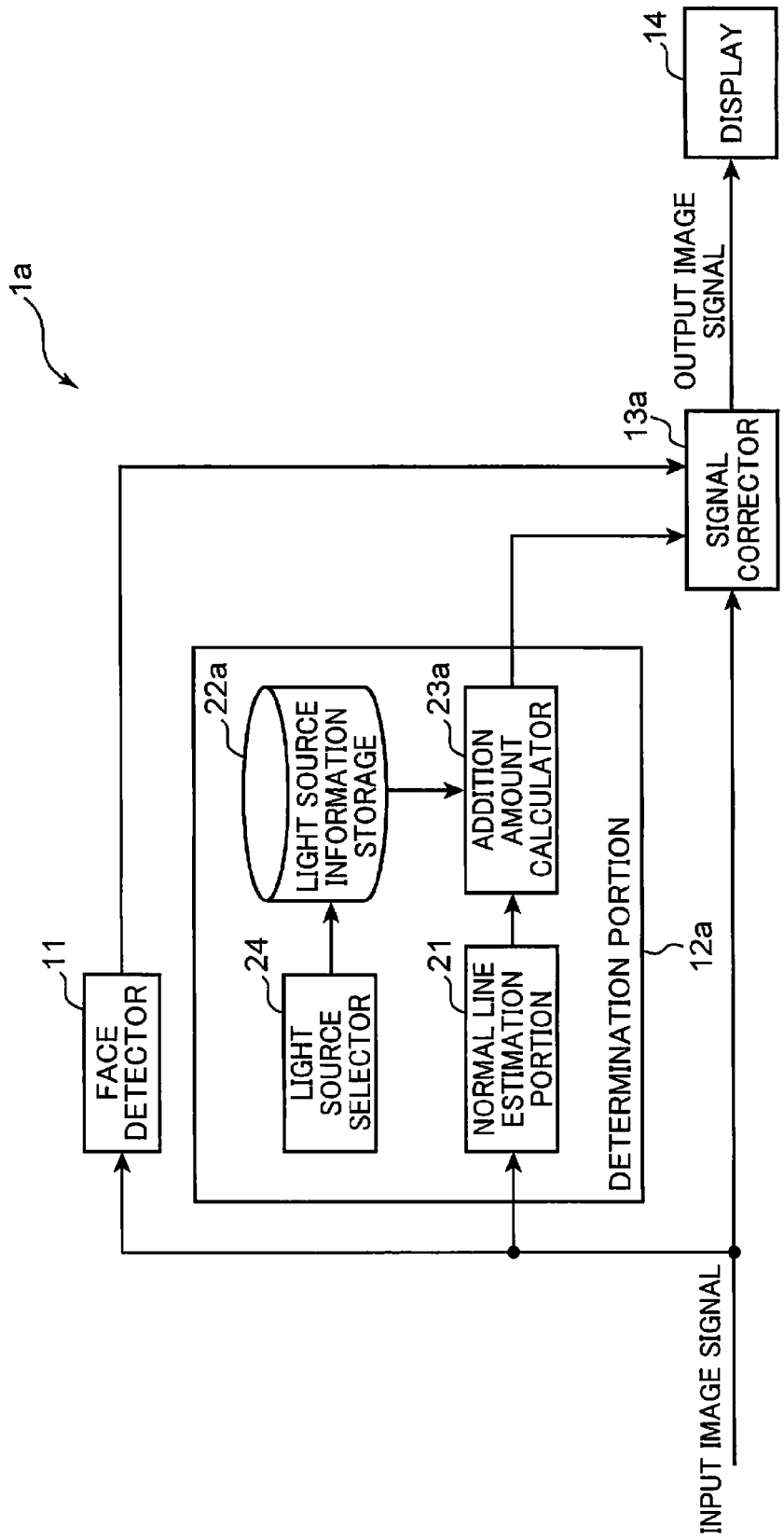
FIG. 16 is a block diagram showing the configuration of an image processing device of a second embodiment.
Figure 17:
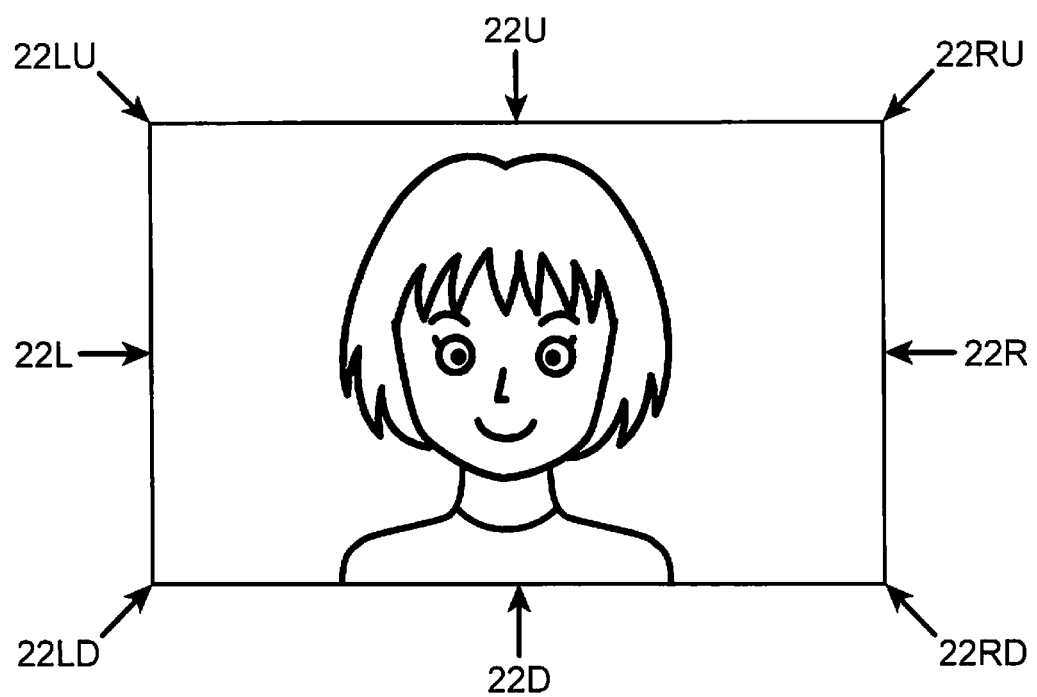
FIG. 17 is a diagram schematically showing the illumination directions of light sources stored in a light source information storage of the second embodiment.

FIG. 16 is a block diagram showing the configuration of an image processing device 1a of a second embodiment. FIG. 17 is a diagram schematically showing the illumination directions of light sources stored in a light source information storage 22a of the second embodiment. In FIG. 16, constituents the same as or similar to those of the first embodiment are denoted by the same or similar symbols. Hereinafter, a description will be given of the second embodiment focusing on the differences between the first and second embodiments.

The image processing device 1a of the second embodiment shown in FIG. 16 has a determination portion 12a and a signal corrector 13a instead of the determination portion 12 and the signal corrector 13 of the image processing device 1 of the first embodiment. The determination portion 12a has the light source information storage 22a and an addition amount calculator 23a instead of the light source information storage 22 and the addition amount calculator 23 of the determination portion 12 shown in FIG. 1 and newly has a light source selector 24.

The light source information storage 22a stores, for example, eight types of illumination directions of light sources and three types of light intensities of the light sources as information on light sources. As shown in FIG. 17, the eight types of the illumination directions of the light sources stored in the light source information storage 22a include a lower-left illumination direction 22LD, a lower illumination direction 22D, a lower-right illumination direction 22RD, a right illumination direction 22R, an upper-right illumination direction 22RU, an upper illumination direction 22U, an upper-left illumination direction 22LU, and a left illumination direction 22L. The three types of the light intensities of the light sources stored in the light source information storage 22a include the three types of high, middle, and low levels.

The light source selector 24 is a user interface having, for example, an operation part operated by a user and a display screen for guiding operation contents. Note that the light source selector 24 may use a display 14 as a display screen instead of a dedicated display screen.

The user selects any of the eight types of the illumination directions of the light sources stored in the light source information storage 22a to be used with the light source selector 24. In addition, the user selects any of the three types of the light intensities of the light sources stored in the light source information storage 22a to be used with the light source selector 24.

For example, in order to select light sources, the user may select the lower illumination direction 22D as a main light source and the lower-left illumination direction 22LD and the lower-right illumination direction 22RD as sub-light sources with the light source selector 24. In this case, the user may select the light intensities of the selected respective light sources with the light source selector 24.

The light source information storage 22a outputs a light source vector that represents an illumination direction selected by the light source selector 24 to the addition amount calculator 23a. In addition, the light source information storage 22a outputs a light intensity selected by the light source selector 24 to the addition amount calculator 23a. In other words, the addition amount calculator 23a reads the light source vector and the light intensity selected by the light source selector 24 from the light source information storage 22a.

Like the addition amount calculator 23 of the first embodiment, the addition amount calculator 23a calculates a change amount $\Delta\alpha$ based on the above expression (3) and then calculates an addition amount $\Delta I$ using the change amount $\Delta\alpha$ based on the above expression (2). In this case, the addition amount calculator 23a sets a constant K0 in the above expression (3) at, for example, 200 when the light intensity of the light source selected by the light source selector 24 is a high level, sets the constant K0 at, for example, 128 when the light intensity thereof is a middle level, and sets the constant K0 at, for example, 50 when the light intensity thereof is a low level.

The signal corrector 13a sets correction gains according to contents selected by the light source selector 24. When a main light source and two sub-light sources are selected by the light source selector 24, the signal corrector 13a sets the upper limit of the correction gain of the main light source at, for example, 0.6 and the upper limits of the correction gains of the sub-light sources at, for example, 0.2 to normalize the sum of the correction gains into 1.

As described above, according to the second embodiment, the light source information storage 22a stores information on light sources, and the light source selector 24 selects any of the light sources. Therefore, a user can select the illumination direction and the light intensity of a desired light source according to an input image. Accordingly, it is possible to select the most appropriate illumination direction depending on, for example, a direction of a face of a person in an input image. In addition, the effect of illuminating the face with a reflection plate in a desired direction can be obtained.

In addition, according to the second embodiment, the light intensity of a light source can be selected. Therefore, the brightness degree of a shaded area of a face can be adjusted to suit user's preference. Moreover, a shaded area of a face can be more naturally cancelled with the selection of illumination directions. Further, a shaded area of a face can be more naturally cancelled, for example, with the light intensity of a main light source set at a high level and the light intensity of a sub-light source set at a middle level.

(Third Embodiment)

Figure 18:
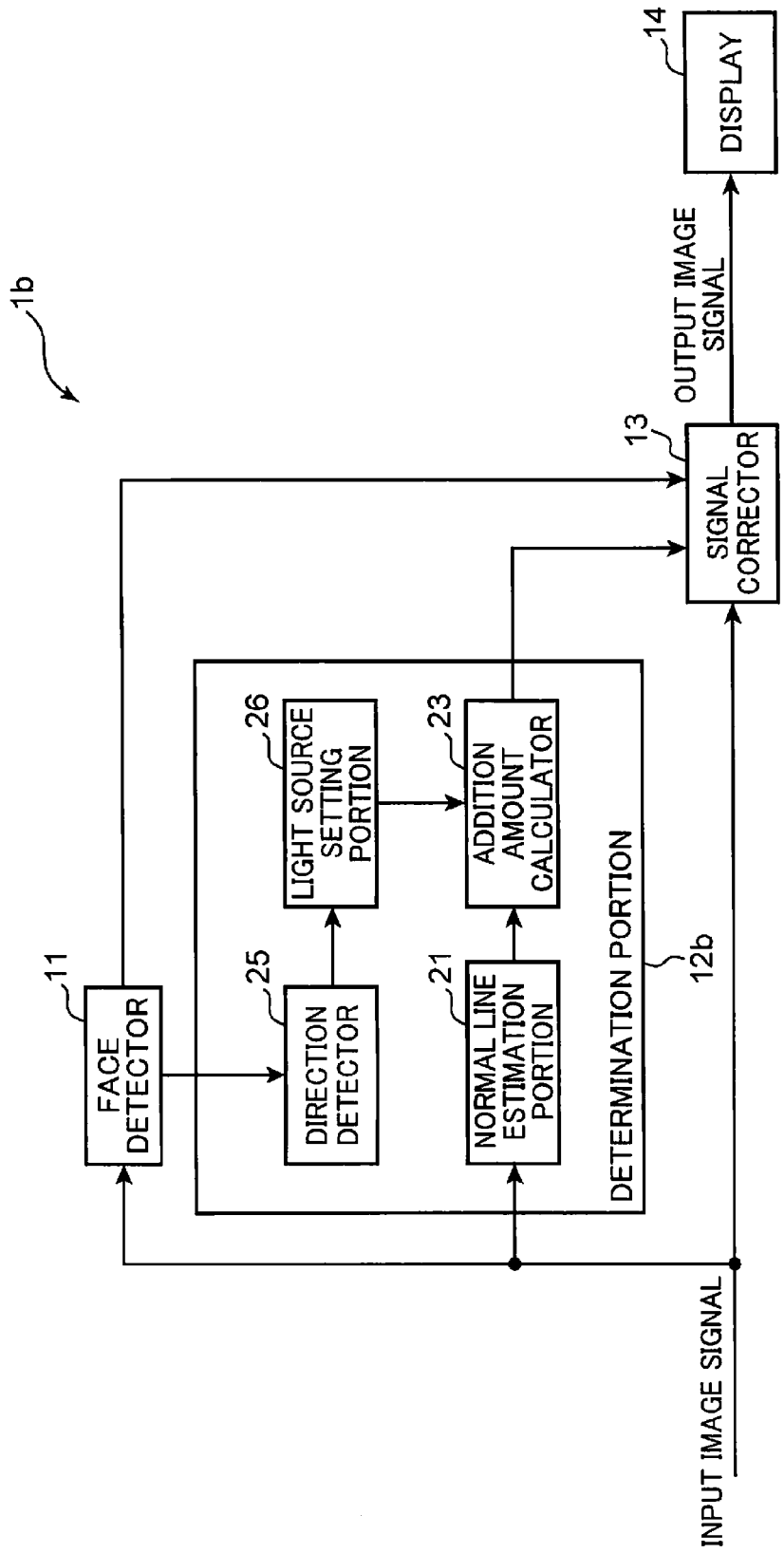
FIG. 18 is a block diagram showing the configuration of an image processing device of a third embodiment.

FIG. 18 is a block diagram showing the configuration of an image processing device 1b of a third embodiment. In FIG. 18, constituents the same as or similar to those of the first embodiment are denoted by the same or similar symbols. Hereinafter, a description will be given of the third embodiment focusing on the differences between the first and third embodiments.

The image processing device 1b of the third embodiment shown in FIG. 18 has a determination portion 12b instead of the determination portion 12 of the image processing device 1 of the first embodiment. The determination portion 12b does not have the light source information storage 22 of the determination portion 12 shown in FIG. 1 but newly has a direction detector 25 and a light source setting portion 26.

With a known method, the direction detector 25 detects a direction of a face of a person based on an input image signal received from a face detector 11. Examples of a method of detecting a direction of a face include a method of narrowing down, with a pattern having the characteristics of the laterally-directed face, a face region through matching with a simple black-and-white pattern having the characteristics of the gradation of a face while reducing or enlarging an input image. In addition, a method of detecting a direction of a face using a learning database including directions of faces is available as such.

In the third embodiment, the direction detector 25 detects a direction of a face in a face region detected by the face detector 11. Note that the direction detector 25 may detect the direction of the face based on an input image signal separately from the detection of a face region by the face detector 11.

The light source setting portion 26 sets the illumination direction of a light source according to the direction of the face detected by the direction detector 25. For example, the light source setting portion 26 sets a lower-right illumination direction when the direction of the face detected by the direction detector 25 is rightward and sets a lower-left illumination direction when the direction thereof is leftward. The light source setting portion 26 outputs a light source vector that represents the set illumination direction of the light source to an addition amount calculator 23.

As described above, according to the third embodiment, the light source setting portion 26 sets the illumination direction of a light source according to a direction of a face detected by the direction detector 25. Accordingly, the effect of brightening a shaded area of a face through illumination with a reflection plate from below at all times can be automatically obtained.

Note that in the third embodiment, the light source setting portion 26 may retain the predetermined light intensity of a light source and output the retained light intensity to the addition amount calculator 23. Alternatively, the addition amount calculator 23 may retain the predetermined light intensity of the light source instead of the light source setting portion 26. In this case, the addition amount calculator 23 may retain the light intensity as the value of a constant K0 in the above expression (3).

In addition, in the third embodiment, the light source setting portion 26 may retain illumination directions and light intensities of light sources as in the above second embodiment. Then, the light source setting portion 26 may set the light intensity of a light source at a high level according to an effecting degree based on a direction of a face detected by the direction detector 25. Thus, it is possible to more naturally cancel a shaded area of a face. On this occasion, the light source setting portion 26 may set the light intensity of a main light source at a high level with the most effective illumination direction as a main direction and set the light intensity of a sub-light source at a low level with the remaining illumination direction as a sub-direction. In addition, the light source setting portion 26 may set, based on an evaluation function at face detection, the light intensity of the light source at a high level according to the degree of an evaluation value.

(Fourth Embodiment)

Figure 19:
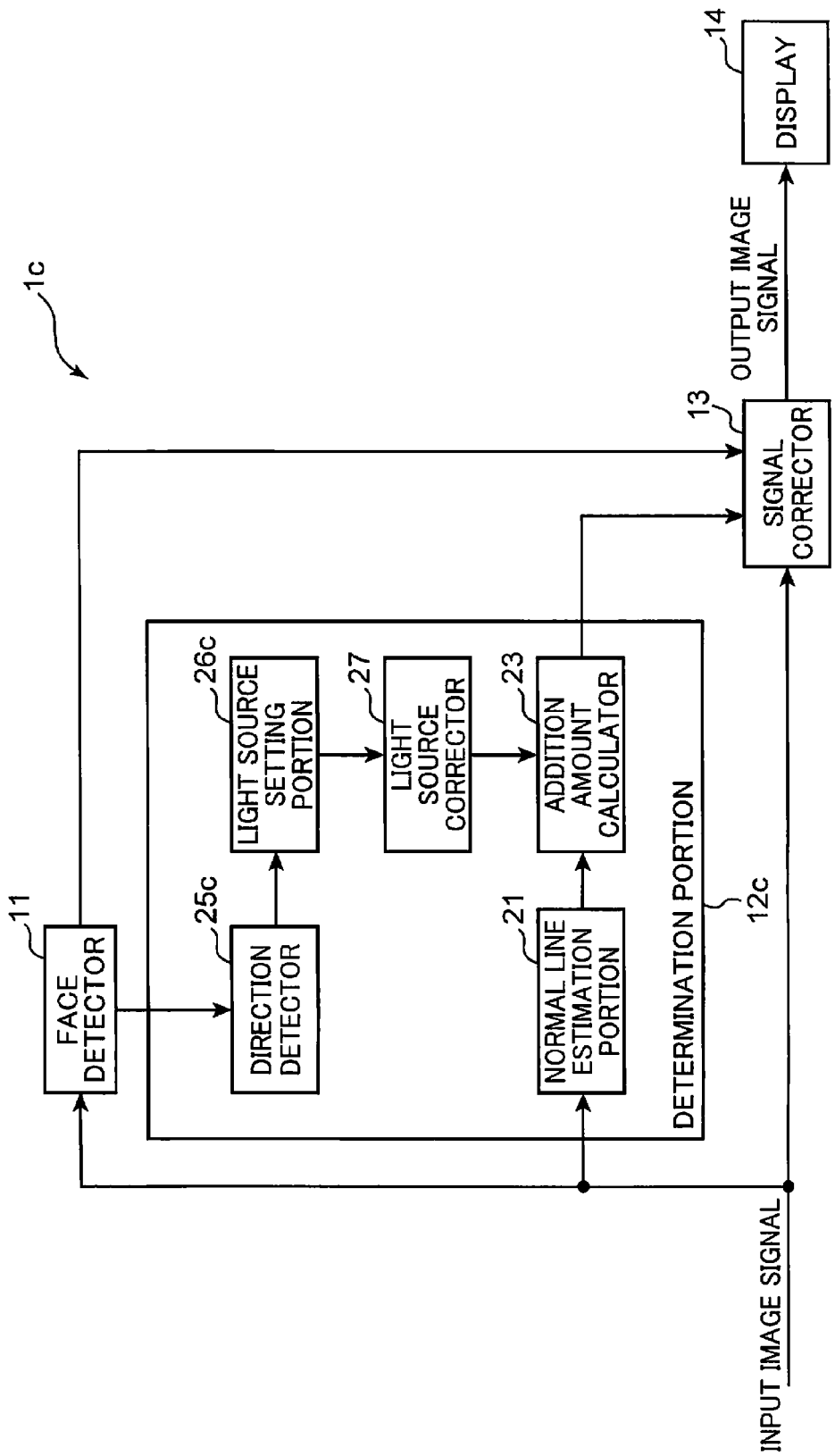
FIG. 19 is a block diagram showing the configuration of an image processing device of a fourth embodiment.

FIG. 19 is a block diagram showing the configuration of an image processing device 1c of a fourth embodiment. In FIG. 19, constituents the same as or similar to those of the third embodiment are denoted by the same or similar symbols. Note that in the fourth embodiment, a direction of a face changes for each frame in an input image signal input for each frame. That is, the input image signal of the fourth embodiment represents a moving picture. Hereinafter, a description will be given of the fourth embodiment focusing on the differences between the third and fourth embodiments.

The image processing device 1c of the fourth embodiment shown in FIG. 19 has a determination portion 12c instead of the determination portion 12b of the image processing device 1b of the third embodiment. The determination portion 12c has a direction detector 25c and a light source setting portion 26c instead of the direction detector 25 and the light source setting portion 26 of the determination portion 12b shown in FIG. 18 and newly has a light source corrector 27.

With a known method, the direction detector 25c detects a direction of a face of a person like the direction detector 25 of the third embodiment. The direction detector 25c detects a direction of a face for each frame based on the input image signal input for each frame. The light source setting portion 26c sets a light source vector that represents the illumination direction of a light source for each frame according to the direction of the face detected by the direction detector 25c for each frame. The light source setting portion 26c outputs the set light source vector to the light source corrector 27 for each frame.

In conjunction with the direction of the face detected by the direction detector 25c, the light source corrector 27 limits a change amount in the illumination direction of a light source (i.e., a light source vector) between frames set for each frame by the light source setting portion 26c. The light source corrector 27 corrects the light source vector output from the light source setting portion 26c for each frame based on, for example, the following expression (4). The light source corrector 27 outputs a corrected light source vector to the addition amount calculator 23 for each frame.

$$Lc(t)=B1 \times L(t)+B2 \times Lc(t-1) \qquad (4)$$

Here, Lc(t) is a corrected light source vector in a current frame, L(t) is a light source vector set by the light source setting portion 26c in the current frame, Lc(t−1) is a corrected light source vector obtained when a light source vector L(t−1) set by the light source setting portion 26c in the frame immediately before the current frame is corrected by the light source corrector 27, and B1 and B2 are weighting coefficients. The weighting coefficients B1 and B2 are set so as to establish the relationship B1+B2=1 and set at 0.5, for example. In the embodiment, the current frame corresponds to an example of the first frame, and the frame immediately before the current frame corresponds to an example of the second frame.

As described above, according to the fourth embodiment, the corrected light source vector of a current frame is calculated based on the set light source vector of the current frame and the light source vector of the frame immediately before the current frame. Therefore, a change amount in the illumination direction between frames is limited such that a change in the illumination direction of a light source set for each frame becomes moderate. Accordingly, a situation in which a moving picture displayed on a display 14 flickers when the illumination direction of a light source largely changes for each frame can be prevented. In addition, since a shaded area of a face less fluctuates, the effect of illuminating the shaded area of the face can be more preferably obtained.

Note that in the fourth embodiment, the light source setting portion 26c may retain the predetermined light intensity of a light source and output the retained light intensity to the addition amount calculator 23 via the light source corrector 27. Alternatively, the addition amount calculator 23 may retain the predetermined light intensity of the light source instead of the light source setting portion 26c. In this case, the addition amount calculator 23 may retain the light intensity as a constant K0 in the above expression (3).

(Fifth Embodiment)

Figure 20:
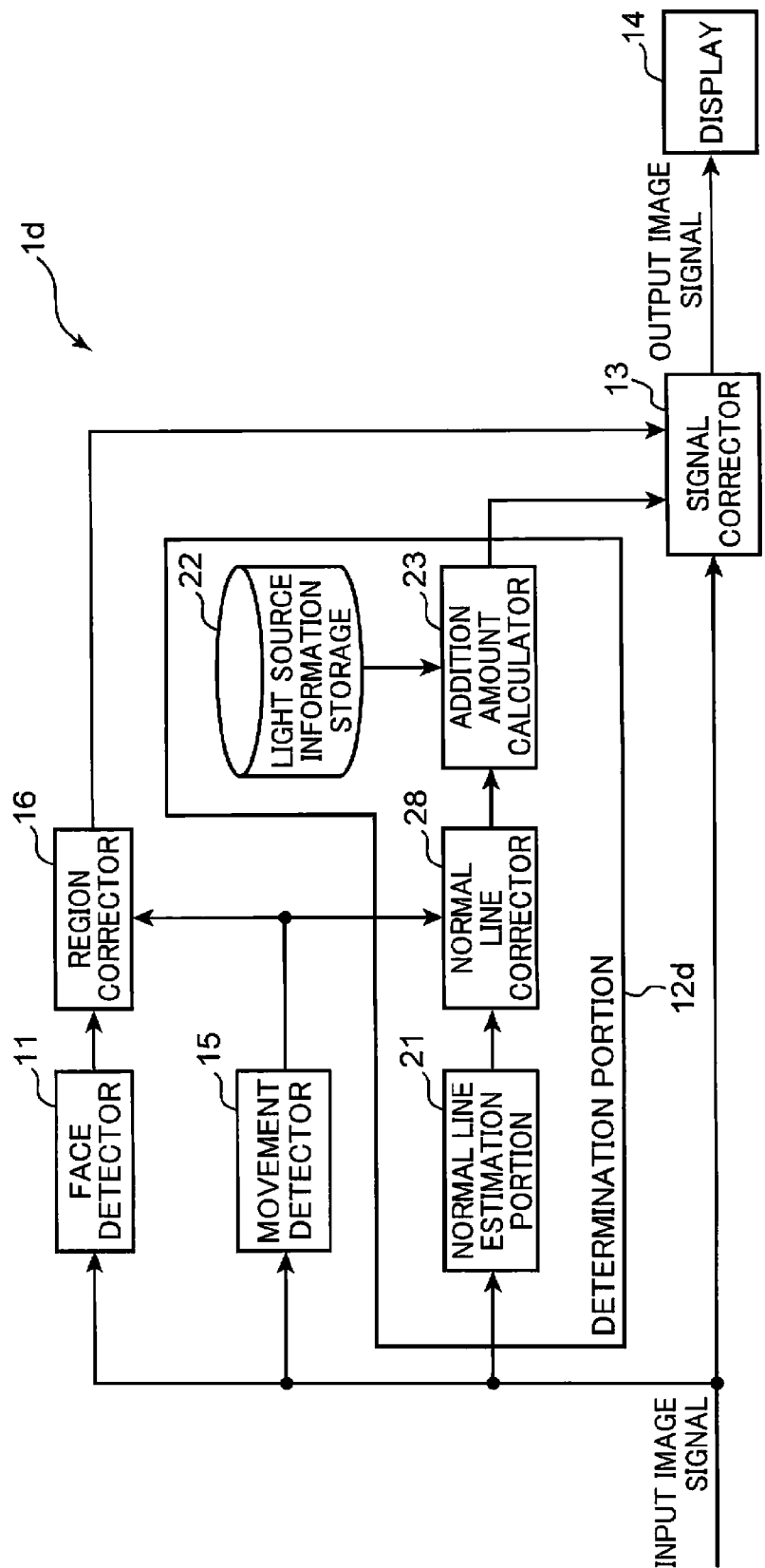
FIG. 20 is a block diagram showing the configuration of an image processing device of a fifth embodiment.

FIG. 20 is a block diagram showing the configuration of an image processing device 1d of a fifth embodiment. In FIG. 20, constituents the same as or similar to those of the first embodiment are denoted by the same or similar symbols. Note that in the fifth embodiment, an input image signal input for each frame represents a moving picture. Hereinafter, a description will be given of the fifth embodiment focusing on the differences between the first and fifth embodiments.

The image processing device 1d of the fifth embodiment shown in FIG. 20 has a determination portion 12d instead of the determination portion 12 of the image processing device 1 of the first embodiment and newly has a movement detector 15 and a region corrector 16. The determination portion 12d newly has a normal line corrector 28 unlike the determination portion 12 shown in FIG. 1.

With a known method, the movement detector 15 detects a movement vector of an image represented by an input image signal. For example, the movement detector 15 virtually divides an image represented by the input image signal into blocks and retrieves and identifies which block of the image of a frame immediately before a current frame is close to the block of the image of the current frame to calculate a movement vector for each block.

The region corrector 16 corrects a face region 110 (FIG. 2) detected by a face detector 11 using the movement vector detected by the movement detector 15. The region corrector 16 corrects the face region 110 detected by the face detector 11 based on, for example, the following expression (5) to obtain a face region Rc(t). The region corrector 16 outputs the face region Rc(t) obtained by the correction to a signal corrector 13.

$$Rc(t)=C1\times R(t)+C2\times Rv(t-1) \quad (5)$$

Here, R(t) is a face region detected by the face detector 11 in a current frame, Rv(t−1) is a region obtained when a face region R(t−1), which is detected by the face detector 11 in the frame immediately before the current frame, is moved by the movement vector of a block close to the face region R(t−1), and C1 and C2 are weighting coefficients. The weighting coefficients C1 and C2 are set so as to establish the relationship C1+C2=1 and set at 0.5, for example.

The normal line corrector 28 corrects a normal line vector estimated by a normal line estimation portion 21 using the movement vector detected by the movement detector 15. The normal line corrector 28 corrects the normal line vector estimated by the normal line estimation portion 21 based on, for example, the following expression (6) to obtain a normal line vector Nc(t). The normal line corrector 28 outputs the normal line vector Nc(t) obtained by the correction to an addition amount calculator 23.

$$Nc(t)=D1\times N(t)+D2\times Nv(t-1) \quad (6)$$

Here, N(t) is a normal line vector estimated by the normal line estimation portion 21 in a current frame, Nv(t−1) is a normal line vector obtained when a normal line vector estimated by the normal line estimation portion 21 in the frame immediately before the current frame is moved by the movement vector of a block including the estimation target pixel of the normal line vector, and D1 and D2 are weighting coefficients. The weighting coefficients D1 and D2 are set so as to establish the relationship D1+D2=1 and set at 0.5, for example. In the embodiment, the current frame corresponds to an example of the first frame, and the frame immediately before the current frame corresponds to an example of the second frame.

As described above, according to the fifth embodiment, since the region corrector 16 corrects a face region detected by the face detector 11 using a movement vector detected by the movement detector 15, a face region that smoothly moves can be obtained. As a result, a moving picture can be prevented from flickering between frames.

In addition, according to the fifth embodiment, since the normal line corrector 28 corrects a normal line vector estimated by the normal line estimation portion 21 using a movement vector detected by the movement detector 15, a normal line vector that smoothly moves can be obtained. As a result, a moving picture can be prevented from flickering when an addition amount largely fluctuates. Thus, according to the fifth embodiment, a shaded area of a face can be more effectively illuminated.

The image processing device 1d of the fifth embodiment has both the region corrector 16 and the normal line corrector 28, but the present invention is not limited to this. For example, an image processing device that does not have the normal line corrector 28 but has only the region corrector 16 may be included. In this embodiment as well, a face region that smoothly moves can be obtained.

In each of the above embodiments, the normal line estimation portion 21 estimates a normal line direction based on an input image signal, but the present invention is not limited to this. The normal line estimation portion 21 may estimate a normal line direction in a face region based on, for example, the input image signal of the face region detected by the face detector 11. Note that the configuration of the device can be simplified when each part of the normal line estimation portion 21 is constituted by a hardware circuit and processing for estimating a normal line direction uniformly based on an input image signal is automatically performed irrespective of a face region unlike the above embodiments.

Note that the above specific embodiments mainly include the invention having the following configurations.

An image processing device according to an aspect of the present invention includes: a face detector which detects a face region including a face of a person from an input image signal; a determination portion which determines, in the input image signal of the face region, an addition amount of a pixel value to be added to the input image signal of the face region based on a size of a difference in a pixel value between adjacent pixels; and a signal corrector which adds the addition amount to the pixel value of the input image signal of the face region.

According to this configuration, in the input image signal of the face region including the face of the person, the addition amount of the pixel value determined based on the size of the difference in the pixel value between the adjacent pixels is added to the pixel value of the input image signal of the face region. Accordingly, a shaded area of the face of the person can be illuminated, and only the area of a cheek can be illuminated when the adjacent pixels have different pixel values even if the pixel values of the input image signal of, for example, the forehead and the cheek of the face of the person are the same.

Further, in the above image processing device, a pixel having a larger pixel value of the input image signal may be defined to be convex compared to a pixel having a smaller pixel value of the input image signal in the face region, the determination portion may include: a normal line estimation portion which estimates a normal line direction of a surface of the face included in the face region based on the size of the difference in the pixel value and the definition; a light source information storage which stores an illumination direction and a light intensity of a light source virtually provided to illuminate the face; and an addition amount calculator which calculates the addition amount based on the normal line direction estimated by the normal line estimation portion and the illumination direction and the light intensity of the light source stored in the light source information storage, the normal line estimation portion may estimate the normal line direction such that the normal line direction becomes closer to parallel to a plane including the face region as the difference in the pixel value becomes larger, and the addition amount calculator may calculate the addition amount such that the addition amount becomes smaller as an angle formed by the normal line direction and the illumination direction of the light source becomes larger.

According to this configuration, the pixel having a larger pixel value of the input image signal is defined to be convex compared to the pixel having a smaller pixel value of the input image signal, and the normal line direction of the surface of the face included in the face region is estimated based on the definition and the size of the difference in the pixel value. Here, the normal line direction is estimated such that the normal line direction becomes closer to parallel to a plane including the face region as the difference in the pixel value becomes larger. Accordingly, the concavo-convex degree of the face of the person can be estimated from the input image signal that represents two-dimensional plane data.

In addition, the addition amount is calculated based on the estimated normal line direction and the stored illumination direction and light intensity of the light source. Here, the addition amount is calculated such that the addition amount becomes smaller as the angle formed by the normal line direction and the illumination direction of the light source becomes larger. Accordingly, the effect of illuminating a shaded area of the face with a reflection plate according to the concavo-convex degree of the face of the person can be obtained. In other words, the facial effect of softening a shadow of the eye and reducing the darkening of the cheek with the application of reflection light onto the face from blow can be obtained.

Further, in the above image processing device, the light source information storage may store different illumination directions as the illumination direction of the light source, the determination portion may further include a light source selector which selects at least one of the illumination directions from the light source information storage according to an operation by a user, and the addition amount calculator may calculate the addition amount using the illumination direction of the light source selected by the light source selector.

According to this configuration, the different illumination directions are stored as the illumination direction of the light source, and at least one of the stored illumination directions is selected according to the operation by the user. Then, the addition amount is calculated using the selected illumination direction of the light source. Accordingly, the effect of illuminating the face with a reflection plate in a desired direction can be obtained when the user selects the desired illumination direction.

Further, in the above image processing device, a pixel having a larger pixel value of the input image signal may be defined to be convex compared to a pixel having a smaller pixel value of the input image signal in the face region, the determination portion may include: a direction detector which detects a direction of the face in the face region; a light source setting portion which sets an illumination direction of a light source virtually provided to illuminate the face based on the direction of the face; a normal line estimation portion which estimates a normal line direction of a surface of the face included in the face region based on the size of the difference in the pixel value and the definition; and an addition amount calculator which calculates the addition amount based on the normal line direction estimated by the normal line estimation portion and the illumination direction of the light source set by the light source setting portion, the light source setting portion may set the illumination direction of the light source such that the face is illuminated from below of a front of the face, the normal line estimation portion may estimate the normal line direction such that the normal line direction becomes closer to parallel to a plane including the face region as the difference in the pixel value becomes larger, and the addition amount calculator may calculate the addition amount such that the addition amount becomes smaller as an angle formed by the normal line direction and the illumination direction of the light source becomes larger.

According to this configuration, the pixel having a larger pixel value of the input image signal is defined to be convex compared to the pixel having a smaller pixel value of the input image signal in the face region, and the normal line direction of the surface of the face included in the face region is estimated based on the definition and the size of the difference in the pixel value. Here, the normal line direction is estimated such that the normal line direction becomes closer to parallel to a plane including the face region as the difference in the pixel value becomes larger. Accordingly, the concavo-convex degree of the face of the person can be estimated from the input image signal that represents two-dimensional plane data.

In addition, the addition amount is calculated based on the estimated normal line direction and the stored illumination direction and light intensity of the light source. Here, the addition amount is calculated such that the addition amount becomes smaller as the angle formed by the normal line direction and the illumination direction of the light source becomes larger. Accordingly, the effect of illuminating a shaded area of a face with a reflection plate according to the concavo-convex degree of the face of the person can be obtained.

In addition, a direction of the face in the face region is detected, and the illumination direction of the light source virtually provided to illuminate the face is set based on the direction of the face. Here, the illumination direction of the light source is set such that the face is illuminated from below of a front of the face. Accordingly, the effect of illuminating the face with a reflection plate from below of the front of the face can be obtained at all times.

Further, in the above image processing device, the determination portion further may include a light source corrector which corrects the illumination direction of the light source set by the light source setting portion, the input image signal may be input for each frame, the direction detector may detect the direction of the face for each frame, the light source setting portion may set a light source vector which represents the illumination direction of the light source based on the direction of the face for each frame, a frame immediately before a first frame may be defined as a second frame, the light source corrector may correct the light source vector set by the light source setting portion for each frame, the addition amount calculator may calculate the addition amount using the light source vector corrected by the light source corrector for each frame, and a corrected light source vector $Lc(t)$ of the first frame corrected by the light source corrector may be calculated using a light source vector $L(t)$ of the first frame set by the light source setting portion and a corrected light source vector $Lc(t-1)$ obtained when a light source vector $L(t-1)$ of the second frame set by the light source setting portion is corrected by the light source corrector.

According to this configuration, the light source vector that represents the illumination direction of the light source is set for each frame based on the direction of the face detected for each frame. The set light source vector is corrected for each frame. The corrected light source vector Lc(t) corrected in the first frame is calculated using the light source vector L(t) set in the first frame and the corrected light source vector Lc(t−1) obtained when the light source vector L(t−1) set in the second frame is corrected. Like this, without using the light source vector set in the first frame as it is, the addition amount is calculated using the corrected light source vector in the first frame obtained using the light source vector set in the first frame and the corrected light source vector corrected in the second frame. Accordingly, a change amount in the illumination direction of the light source between the second frame and the first frame can be reduced. As a result, an image can be prevented from flickering between the second frame and the first frame when the illumination direction of the light source changes.

Further, the above image processing device may further include: a movement detector which detects, for each frame, a movement vector between adjacent frames based on the input image signal input for each frame; and a region corrector which corrects the face region detected by the face detector based on the movement vector to output a corrected face region, wherein a pixel having a larger pixel value of the input image signal may be defined to be convex compared to a pixel having a smaller pixel value of the input image signal in the corrected face region, the determination portion may include: a normal line estimation portion which estimates a normal line direction of a surface of the face included in the corrected face region based on the size of the difference in the pixel value and the definition, a light source information storage which stores an illumination direction and a light intensity of a light source virtually provided to illuminate the face, and an addition amount calculator which calculates an addition amount of a pixel value to be added to the input image signal of the corrected face region based on the normal line direction estimated by the normal line estimation portion and the illumination direction and the light intensity of the light source stored in the light source information storage, a frame immediately before a first frame may be defined as a second frame, the face detector may detect the face region for each frame, the region corrector may correct the face region for each frame, the normal line estimation portion may estimate the normal line direction such that the normal line direction becomes closer to parallel to a plane including the corrected face region as the difference in the pixel value becomes larger, the addition amount calculator may calculate the addition amount such that the addition amount becomes smaller as an angle formed by the normal line direction and the illumination direction of the light source becomes larger, the signal corrector may add the addition amount to the pixel value of the input image signal of the corrected face region, and a corrected face region Rc(t) of the first frame corrected by the region corrector may be calculated using a face region R(t) of the first frame detected by the face detector and a region Rv(t−1) obtained when a face region R(t−1) of the second frame detected by the face detector is moved by the movement vector.

According to this configuration, the movement vector between adjacent frames is detected for each frame based on the input image signal input for each frame. The face region is corrected based on the movement vector to output the corrected face region. The pixel having a larger pixel value of the input image signal is defined to be convex compared to the pixel having a smaller pixel value of the input image signal in the corrected face region, and the normal line direction of the surface of the face included in the corrected face region is estimated based on the definition and the size of the difference in the pixel value. Here, the normal line direction is estimated such that the normal line direction becomes closer to parallel to a plane including the corrected face region as the difference in the pixel value becomes larger. Accordingly, the concavo-convex degree of the face of the person can be estimated from the input image signal that represents two-dimensional plane data.

In addition, the addition amount of the pixel value added to the input image signal of the corrected face region is calculated based on the estimated normal line direction and the stored illumination direction and light intensity of the light source. Here, the addition amount is calculated such that the addition amount becomes smaller as the angle formed by the normal line direction and the illumination direction of the light source becomes larger. Accordingly, the effect of illuminating a shaded area of the face with a reflection plate according to the concavo-convex degree of the face of the person can be obtained.

In addition, the face region is detected for each frame, and the detected face region is corrected for each frame. The corrected face region Rc(t) corrected in the first frame is calculated using the face region R(t) detected in the first frame and the region Rv(t−1) obtained when the face region R(t−1) detected in the second frame is moved by the movement vector. In this way, without using the face region detected in the first frame as it is, the corrected face region in the first frame obtained when the face region detected in the first frame and the region obtained when the face region detected in the second frame is moved by the movement vector is used. Accordingly, the movement of the face region between the second frame and the first frame can be smoothed in consideration of the movement vector. As a result, an image can be prevented from flickering between the second frame and the first frame when the face region moves.

Further, in the above image processing device, the determination portion may further include a normal line corrector which corrects a normal line vector, which represents the normal line direction estimated by the normal line estimation portion, based on the movement vector for each frame, the addition amount calculator may calculate the addition amount using the corrected normal line vector corrected by the normal line corrector for each frame, and a corrected normal line vector Nc(t) of the first frame corrected by the normal line corrector may be calculated using a normal line vector N(t) of the first frame, which represents the normal line direction estimated by the normal line estimation portion, and a normal line vector Nv(t−1) obtained when a normal line vector N(t−1) of the second frame, which represents the normal line direction estimated by the normal line estimation portion, is moved by the movement vector.

According to this configuration, the normal line vector that represents the estimated normal line direction is corrected based on the movement vector for each frame. The corrected normal line vector Nc(t) corrected in the first frame is calculated using the normal line vector N(t), which represents the normal line direction estimated in the first frame, and the normal line vector Nv(t−1) obtained when the normal line vector N(t−1) that represents the normal line direction estimated in the second frame is moved by the movement vector. In this way, without using the normal line vector that represents the normal line direction estimated in the first frame as it is, the corrected normal line vector in the first frame calculated using the normal line vector, which represents the normal line direction estimated in the first frame, and the normal line vector obtained when the normal line vector that represents the normal line direction estimated in the second frame is moved by the movement vector is used. Accordingly, a change in the normal line vector between the second frame and the first frame can be smoothed in consideration of the movement vector. As a result, an image can be prevented from flickering between the second frame and the first frame due to the change of the normal line vector.

Further, in the above image processing device, respective pixels of the input image signal may be arranged in a matrix in a first direction and in a second direction orthogonal to the first direction, the normal line estimation portion may include: a first differential processor which differentiates a pixel value of an estimation target pixel, for which the normal line direction is estimated, in the first direction to output a first differential value; a second differential processor which differentiates the pixel value of the estimation target pixel in the second direction to output a second differential value; and a spatial filter processor which smooths the first differential value to output a first smoothed value and smooths the second differential value to output a second smoothed value, and the normal line estimation portion may retain a fixed value determined in advance, and may generate a normal line vector, which represents the normal line direction, with the first smoothed value as a component in the first direction of the normal line vector, the second smoothed value as a component in the second direction of the normal line vector, and the fixed value as a component in a third direction of the normal line vector.

According to this configuration, the pixel value of the estimation target pixel is differentiated in the first direction to output the first differential value, the first differential value is smoothed to output the first smoothed value, and the first smoothed value is used as the component in the first direction of the normal line vector. The pixel value of the estimation target pixel is differentiated in the second direction to output the second differential value, the second differential value is smoothed to output the second smoothed value, and the second smoothed value is used as the component in the second direction of the normal line vector. In addition, the fixed value determined in advance is used as the component in a third direction of the normal line vector.

In this way, since the first differential value and the second differential value are smoothed, small fluctuations in the first differential value and the second differential value are prevented. As a result, the normal line vector can be efficiently generated. In addition, since the component in the third direction is at the fixed value, the three-dimensional normal line vector can be easily generated from the input image signal of the two-dimensional face region.

Further, in the above image processing device, the addition amount calculator may calculate the addition amount from the angle formed by the normal line direction and the illumination direction of the light source, and from a pixel value of each pixel of the input image signal.

According to this configuration, the addition amount is calculated from the angle formed by the normal line direction and the illumination direction of the light source, and from the pixel value of each pixel of the input image signal. Accordingly, the addition amount of an appropriate value can be calculated in consideration of an illumination angle with respect to the concavo-convex degree of the face. In addition, for example, the addition amount can be easily calculated using a function, an expression, or the like that represents the addition amount using the angle formed by the normal line direction and the illumination direction of the light source and the pixel value of each pixel of the input image signal.

Further, in the above image processing device, the addition amount calculator may calculate the addition amount $\Delta I$ using the following expressions.

$$\Delta I = I\text{in} \times \sin \alpha \times \Delta \alpha$$

$$\Delta \alpha = F1(I\text{in}) \times F2(\alpha) \times K0$$

Here, Iin is the pixel value of the input image signal, $\alpha$ is the angle formed by the normal line direction and the illumination direction of the light source, F1(Iin) is a function which becomes a constant K1 ($0 \leq K1 < 1$) when the pixel value Iin is in a range of 0 to a predetermined value Iin1, linearly decreases according to the pixel value Iin when the pixel value Iin exceeds the predetermined value Iin1, and becomes 0 when the pixel value Iin is equal to a predetermined value Iin2 (Iin1<Iin2), F2($\alpha$) is a function which is set to a maximum value K2 ($0 \leq K2 \leq 1$) when the angle $\alpha$ is equal to a specific angle $\alpha 0$ determined in advance and is set to decrease when the angle $\alpha$ deviates from the specific angle $\alpha 0$, and K0 is a constant which is set according to the light intensity of the light source.

According to this configuration, F1(Iin) is the constant K1 ($0 \leq K1 < 1$) when the pixel value Iin is in the range of 0 to the predetermined value Iin1. Thus, an image can be prevented from being too bright in a range in which the pixel value of the input image signal is small. In addition, F1(Iin) linearly decreases according to the pixel value Iin when the pixel value Iin exceeds the predetermined value Iin1, and becomes 0 when the pixel value Iin is equal to the predetermined value Iin2. Thus, the pixel value can be prevented from being saturated in a range in which the pixel value of input image signal is large.

In addition, F2($\alpha$) is the function which is set to the maximum value K2 ($0 \leq K2 \leq 1$) when the angle $\alpha$ is equal to the specific angle $\alpha 0$ determined in advance and is set to decrease when the angle $\alpha$ deviates from the specific angle $\alpha 0$. Thus, the addition amount can increase only when the angle $\alpha$ is equal to the specific angle $\alpha 0$. In addition, K0 is the constant that is set according to the light intensity of the light source. Thus, the addition amount of an appropriate value can be obtained according to the light intensity of the light source. As a result, a shaded area of the face can be preferably illuminated based on the expression $\Delta I = I\text{in} \times \sin \alpha \times \Delta \alpha$.

An image processing method according to an aspect of the present invention includes: a face detection step of detecting a face region including a face of a person from an input image signal; a determination step of determining, in the input image signal of the face region, an addition amount of a pixel value to be added to the input image signal of the face region based on a size of a difference in a pixel value between adjacent pixels; and a signal correction step of adding the addition amount to the pixel value of the input image signal of the face region.

According to this configuration, in the input image signal of the face region including the face of the person, the addition amount of the pixel value determined based on the size of the difference in the pixel value between the adjacent pixels is added to the pixel value of the input image signal of the face region. Accordingly, a shaded area of the face of the person can be illuminated.

INDUSTRIAL APPLICABILITY

The image processing device and the image processing method according to the present invention are useful as an image processing device and an image processing method capable of illuminating a shaded area of a face of a person by adding, in the input image signal of a face region including the face of the person, an addition amount of a pixel value determined based on a size of a difference in the pixel value between adjacent pixels to the pixel value of the input image signal of the face region.

What is claimed is:

1. An image processing device comprising:
a face detector which detects a face region including a face of a person from an input image signal;
a determination portion which determines, in the input image signal of the face region, an addition amount of a pixel value to be added to the input image signal of the face region based on a size of a difference in a pixel value between adjacent pixels; and
a signal corrector which adds the addition amount to the pixel value of the input image signal of the face region, wherein
a pixel having a larger pixel value of the input image signal is defined to be convex compared to a pixel having a smaller pixel value of the input image signal in the face region,
the determination portion includes:
a direction detector which detects a direction of the face in the face region;
a light source setting portion which sets an illumination direction of a light source virtually provided to illuminate the face based on the direction of the face;
a normal line estimation portion which estimates a normal line direction of a surface of the face included in the face region based on the size of the difference in the pixel value and the definition;
an addition amount calculator which calculates the addition amount based on the normal line direction estimated by the normal line estimation portion and the illumination direction of the light source set by the light source setting portion; and,
a light source corrector which corrects the illumination direction of the light source set by the light source setting portion,
the light source setting portion sets the illumination direction of the light source such that the face is illuminated from below of a front of the face,
the normal line estimation portion estimates the normal line direction such that the normal line direction becomes closer to parallel to a plane including the face region as the difference in the pixel value becomes larger,
the addition amount calculator calculates the addition amount such that the addition amount becomes smaller as an angle formed by the normal line direction and the illumination direction of the light source becomes larger,
the input image signal is input for each frame,
the direction detector detects the direction of the face for each frame,
the light source setting portion sets a light source vector which represents the illumination direction of the light source based on the direction of the face for each frame,
a frame immediately before a first frame is defined as a second frame,
the light source corrector corrects the light source vector set by the light source setting portion for each frame,
the addition amount calculator calculates the addition amount using the light source vector corrected by the light source corrector for each frame, and a corrected light source vector Lc(t) of the first frame corrected by the light source corrector is calculated using a light source vector L(t) of the first frame set by the light source setting portion and a corrected light source vector Lc(t−1) obtained when a light source vector L(t−1) of the second frame set by the light source setting portion is corrected by the light source corrector.

2. The image processing device according to claim 1, wherein the addition amount calculator calculates the addition amount from the angle formed by the normal line direction and the illumination direction of the light source, and from a pixel value of each pixel of the input image signal.

3. An image processing device comprising:
a face detector which detects a face region including a face of a person from an input image signal;
a determination portion which determines, in the input image signal of the face region, an addition amount of a pixel value to be added to the input image signal of the face region based on a size of a difference in a pixel value between adjacent pixels;
a signal corrector which adds the addition amount to the pixel value of the input image signal of the face region;
a movement detector which detects, for each frame, a movement vector between adjacent frames based on the input image signal input for each frame; and
a region corrector which corrects the face region detected by the face detector based on the movement vector to output a corrected face region,
wherein a pixel having a larger pixel value of the input image signal is defined to be convex compared to a pixel having a smaller pixel value of the input image signal in the corrected face region,
the determination portion includes:
a normal line estimation portion which estimates a normal line direction of a surface of the face included in the corrected face region based on the size of the difference in the pixel value and the definition,
a light source information storage which stores an illumination direction and a light intensity of a light source virtually provided to illuminate the face, and
an addition amount calculator which calculates an addition amount of a pixel value to be added to the input image signal of the corrected face region based on the normal line direction estimated by the normal line estimation portion and the illumination direction and the light intensity of the light source stored in the light source information storage,
a frame immediately before a first frame is defined as a second frame,
the face detector detects the face region for each frame,
the region corrector corrects the face region for each frame,
the normal line estimation portion estimates the normal line direction such that the normal line direction becomes closer to parallel to a plane including the corrected face region as the difference in the pixel value becomes larger,
the addition amount calculator calculates the addition amount such that the addition amount becomes smaller as an angle formed by the normal line direction and the illumination direction of the light source becomes larger, the signal corrector adds the addition amount to the pixel value of the input image signal of the corrected face region, and a corrected face region Rc(t) of the first frame corrected by the region corrector is calculated using a face region R(t) of the first frame detected by the face detector and a region Rv(t−1) obtained when a face region R(t−1) of the second frame detected by the face detector is moved by the movement vector.

4. The image processing device according to claim 3, wherein the determination portion further includes a normal line corrector which corrects a normal line vector, which represents the normal line direction estimated by the normal line estimation portion, based on the movement vector for each frame, the addition amount calculator calculates the addition amount using the corrected normal line vector corrected by the normal line corrector for each frame, and a corrected normal line vector Nc(t) of the first frame corrected by the normal line corrector is calculated using a normal line vector N(t) of the first frame, which represents the normal line direction estimated by the normal line estimation portion, and a normal line vector Nv(t−1) obtained when a normal line vector N(t−1) of the second frame, which represents the normal line direction estimated by the normal line estimation portion, is moved by the movement vector.

5. An image processing device comprising:
a face detector which detects a face region including a face of a person from an input image signal;
a determination portion which determines, in the input image signal of the face region, an addition amount of a pixel value to be added to the input image signal of the face region based on a size of a difference in a pixel value between adjacent pixels; and
a signal corrector which adds the addition amount to the pixel value of the input image signal of the face region,
wherein a pixel having a larger pixel value of the input image signal is defined to be convex compared to a pixel having a smaller pixel value of the input image signal in the face region,
the determination portion includes:
  a normal line estimation portion which estimates a normal line direction of a surface of the face included in the face region based on the size of the difference in the pixel value and the definition;
  a light source information storage which stores an illumination direction and a light intensity of a light source virtually provided to illuminate the face; and
  an addition amount calculator which calculates the addition amount based on the normal line direction estimated by the normal line estimation portion and the illumination direction and the light intensity of the light source stored in the light source information storage,
the normal line estimation portion estimates the normal line direction such that the normal line direction becomes closer to parallel to a plane including the face region as the difference in the pixel value becomes larger,
the addition amount calculator calculates the addition amount such that the addition amount becomes smaller as an angle formed by the normal line direction and the illumination direction of the light source becomes larger,
respective pixels of the input image signal are arranged in a matrix in a first direction and in a second direction orthogonal to the first direction, the normal line estimation portion includes:
  a first differential processor which differentiates a pixel value of an estimation target pixel, for which the normal line direction is estimated, in the first direction to output a first differential value;
  a second differential processor which differentiates the pixel value of the estimation target pixel in the second direction to output a second differential value; and
  a spatial filter processor which smooths the first differential value to output a first smoothed value and smooths the second differential value to output a second smoothed value, and
the normal line estimation portion retains a fixed value determined in advance, and generates a normal line vector, which represents the normal line direction, with the first smoothed value as a component in the first direction of the normal line vector, the second smoothed value as a component in the second direction of the normal line vector, and the fixed value as a component in a third direction of the normal line vector.

6. An image processing device comprising:
a face detector which detects a face region including a face of a person from an input image signal;
a determination portion which determines, in the input image signal of the face region, an addition amount of a pixel value to be added to the input image signal of the face region based on a size of a difference in a pixel value between adjacent pixels; and
a signal corrector which adds the addition amount to the pixel value of the input image signal of the face region,
wherein a pixel having a larger pixel value of the input image signal is defined to be convex compared to a pixel having a smaller pixel value of the input image signal in the face region,
the determination portion includes:
  a normal line estimation portion which estimates a normal line direction of a surface of the face included in the face region based on the size of the difference in the pixel value and the definition;
  a light source information storage which stores an illumination direction and a light intensity of a light source virtually provided to illuminate the face; and
  an addition amount calculator which calculates the addition amount based on the normal line direction estimated by the normal line estimation portion and the illumination direction and the light intensity of the light source stored in the light source information storage,
the normal line estimation portion estimates the normal line direction such that the normal line direction becomes closer to parallel to a plane including the face region as the difference in the pixel value becomes larger,
the addition amount calculator calculates the addition amount such that the addition amount becomes smaller as an angle formed by the normal line direction and the illumination direction of the light source becomes larger,
the addition amount calculator calculates the addition amount from the angle formed by the normal line direction and the illumination direction of the light source, and from a pixel value of each pixel of the input image signal, and
the addition amount calculator calculates the addition amount ΔI using the following expressions:

$$\Delta I = I\text{in} \times \sin \alpha \times \Delta\alpha$$

$$\Delta\alpha = F1(I\text{in}) \times F2(\alpha) \times K0$$

where Iin is the pixel value of the input image signal, a is the angle formed by the normal line direction and the illumination direction of the light source, F1 (Iin) is a function which becomes a constant K1 ($0 \leq K1 < 1$) when the pixel value fin is in a range of 0 to a predetermined value Iin1, linearly decreases according to the pixel value Iin when the pixel value Iin exceeds the predetermined value Iin1, and becomes 0 when the pixel value Iin is equal to a predetermined value Iin2 (Iin1<Iin2), F2($\alpha$) is a function which is set to a maximum value K2 ($0 \leq K2 \leq 1$) when the angle $\alpha$ is equal to a specific angle $\alpha0$ determined in advance and set to decrease when the angle $\alpha$ deviates from the specific angle $\alpha0$, and K0 is a constant which is set according to the light intensity of the light source.

* * * * *